United States Patent
Grimlund

(12) 
(10) Patent No.: US 7,051,509 B2
(45) Date of Patent: May 30, 2006

(54) APPARATUS FOR REDUCING FOREIGN OBJECT DEBRIS INGESTION INTO AIRCRAFT ENGINES

(75) Inventor: Kristin E. Grimlund, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/353,284

(22) Filed: Jan. 29, 2003

(65) Prior Publication Data

US 2004/0144097 A1   Jul. 29, 2004

(51) Int. Cl.
   *F02C 7/05*   (2006.01)
(52) U.S. Cl. ............... 60/39.092; 137/15.1; 244/53 B
(58) Field of Classification Search ............... 55/306; 60/39.092; 137/15.1, 15.2; 244/53 B
   See application file for complete search history.

(56) References Cited

U.S. PATENT DOCUMENTS 3,347,496 A * 10/1967 Opfer, Jr. .................. 244/53 B
3,568,694 A *  3/1971 Johnson ..................... 137/15.1
4,502,875 A *  3/1985 Ballard .................... 60/39.092

* cited by examiner

*Primary Examiner*—Michael Koczo, Jr.

(57) ABSTRACT

Apparatus and methods for reducing foreign object debris ingestion into aircraft engines. The apparatus includes a door disposed at a forward end portion of a housing portion of the engine. The door is movable with respect to the engine between a first position in which a first engine inlet is open and a second engine inlet is substantially blocked by the door, and a second position in which the second engine inlet is open and the first engine inlet is substantially blocked by the door. Accordingly, moving the door to its first position during taxiing, takeoff, and landing substantially reduces the risk of foreign object debris ingestion into the second engine inlet.

7 Claims, 4 Drawing Sheets

APPARATUS FOR REDUCING FOREIGN OBJECT DEBRIS INGESTION INTO AIRCRAFT ENGINES

FIELD OF THE INVENTION

The present invention relates generally to aircraft engines and more particularly to apparatus and methods for reducing foreign object debris (FOD) ingestion into aircraft engines.

BACKGROUND OF THE INVENTION

The risk of foreign object debris (FOD) ingestion into aircraft engines is an important design consideration that limits optimization of engine inlet location relative to the main landing gear for aerodynamic performance, regulatory requirements, and economic feasibility. Indeed, many aircraft designs position the inlets of underwing-mounted engines in front of the main landing gear to reduce the chances that the engine inlets will ingest runway debris (rocks, water, tire debris, aircraft parts, slush, gear ice, etc.) thrown by the main landing gear tires. This is so even though such an arrangement is not optimal for aerodynamic performance, regulatory requirements, and economic feasibility. In short, the risk of FOD ingestion into engine inlets significantly limits the number of possible landing gear/engine inlet arrangements that may be analyzed in order to optimize aircraft performance.

SUMMARY OF THE INVENTION

Accordingly, a need exists in the art for an apparatus and method that reduce the probability of FOD ingestion into engines in an economically feasible manner, thereby allowing a greater number of landing gear/engine inlet arrangements to be implemented in order to optimize aircraft performance.

The present invention is directed to apparatus and methods for reducing FOD ingestion into engines. In one embodiment, the apparatus includes a door disposed at a forward end portion of a housing portion of the engine. The door is movable with respect to the engine between a first position in which a first engine inlet is open and a second engine inlet is substantially blocked by the door, and a second position in which the second engine inlet is open and the first engine inlet is substantially blocked by the door. Accordingly, moving the door to its first position during taxiing, takeoff, and landing substantially reduces the risk of foreign object debris ingestion into the second engine inlet.

Further areas of applicability of the present invention will become apparent from the detailed description provided hereinafter. It should be understood that the detailed description and specific examples, while indicating at least one preferred embodiment of the invention, are intended for purposes of illustration only and are not intended to limit the scope of the invention.

BRIEF DESCRIPTION OF THE DRAWINGS

The present invention will be more fully understood from the detailed description and the accompanying drawings, wherein.

Corresponding reference characters indicate corresponding features throughout the drawings.

DETAILED DESCRIPTION OF THE PREFERRED EMBODIMENTS

The following description of the preferred embodiment(s) is merely exemplary in nature and is in no way intended to limit the invention, its application, or uses.

Figure 1:
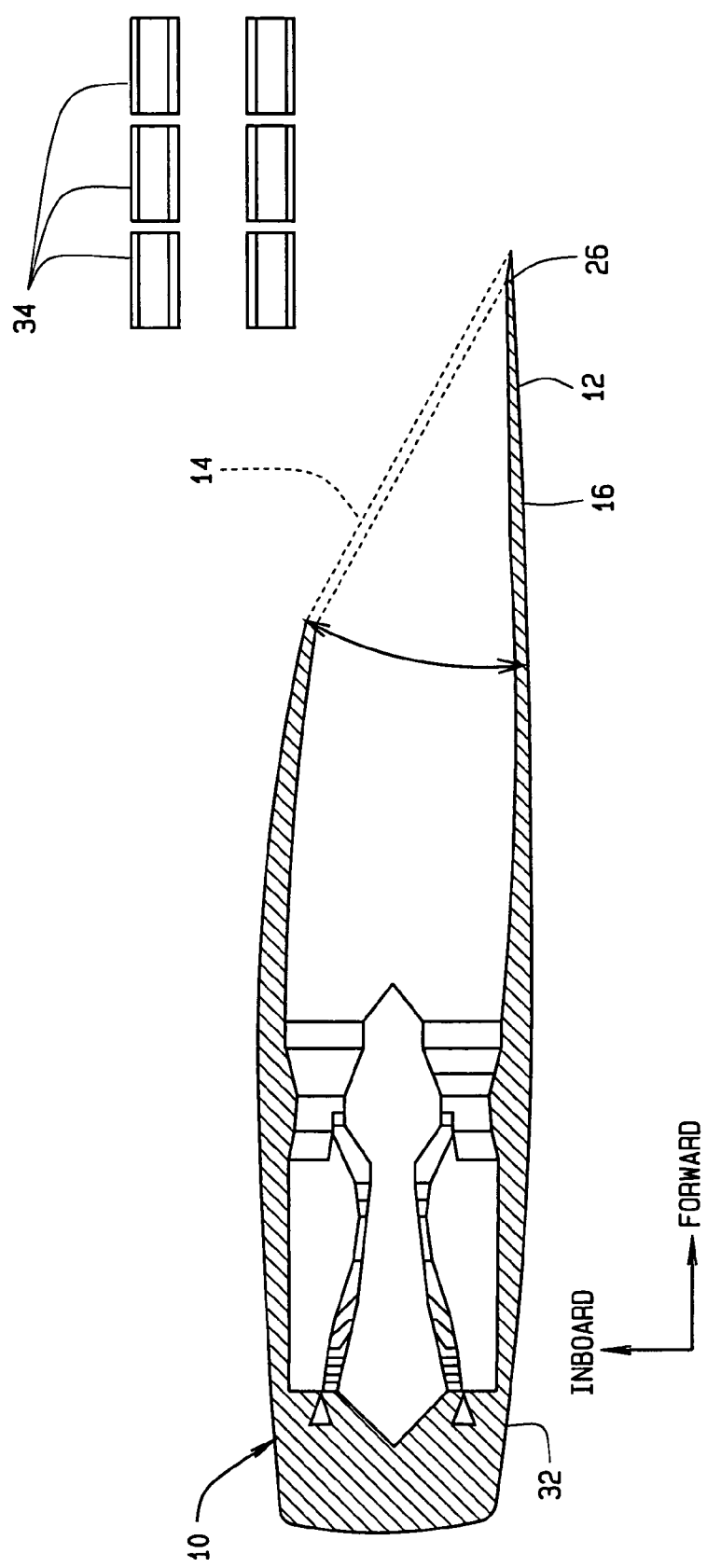
FIG. 1 is a lower plan view of an exemplary aircraft engine including a door for reducing FOD ingestion in accordance with a preferred embodiment of the present invention.

Referring to FIG. 1, there is shown an exemplary aircraft engine 10 that has been provided with a door 12 for reducing foreign object debris (FOD) ingestion into the engine 10 in accordance with a preferred embodiment of the present invention. As shown, the door 12 is pivotally mounted to a housing portion or nacelle 32 of the engine 10, which allows the door 12 to be moved between at least a first position 14 and a second position 16.

Figure 2A:
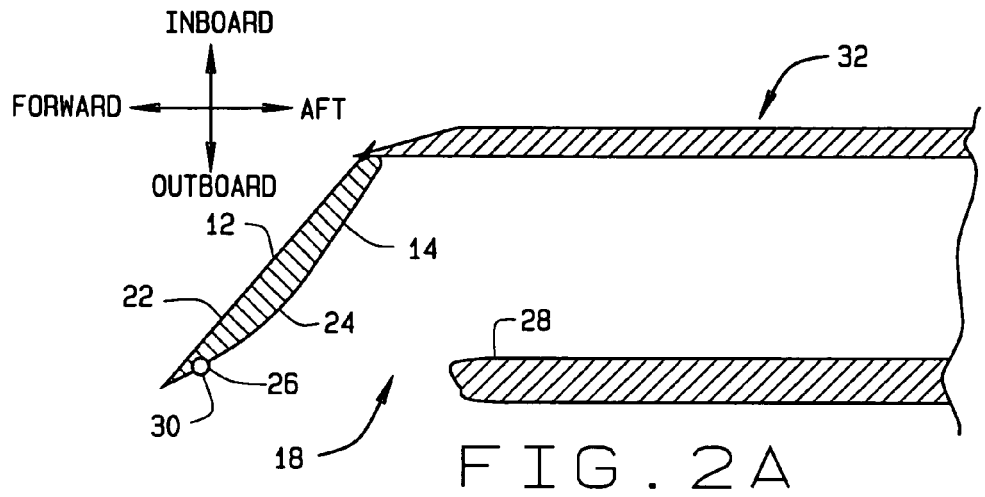
FIGS. 2A through 2C are partial upper plan views of the engine shown in FIG. 1 illustrating the inlet portion and various door positions.
Figure 2B:
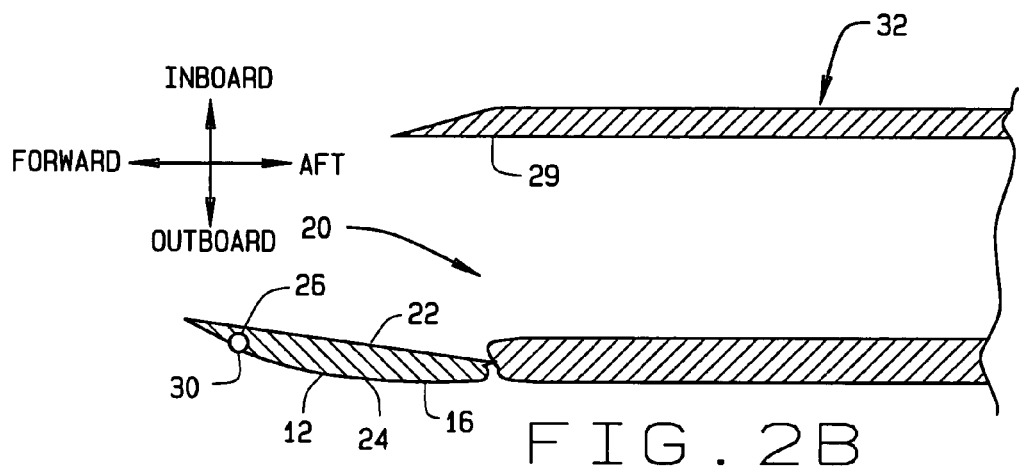
Figure 2C:
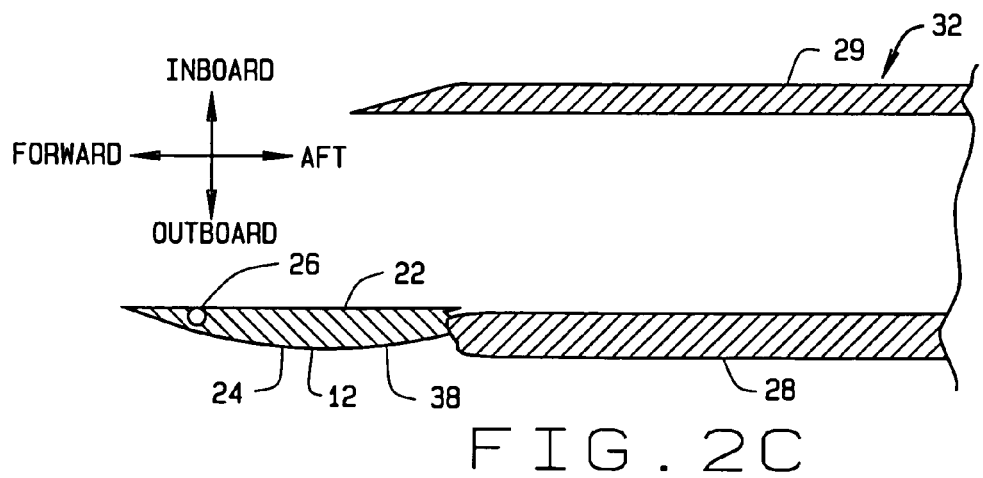

When the door 12 is moved to the first position 14, a first engine inlet 18 (FIG. 2A) is opened while the second engine inlet 20 is substantially closed or blocked by the door 12. Conversely, and as shown in FIG. 2B, the second engine inlet 20 is opened when the door 12 is moved to the second position 16 but the first engine inlet 18 is substantially closed or blocked by the door 12. As the door 12 is moving, however, air flows on both sides 22 and 24 of the door 12, resulting in little to no dead air space.

In the illustrated embodiment, the door 12 is pivotally mounted to the engine 10 at a pivot point 26 disposed at an outboard and forward most portion of the engine nacelle 32. As shown in FIG. 2A, the first engine inlet 18 is formed between an outboard nacelle portion 28 and the side 24 of the door 12 when the door 12 is in the first position 14. Accordingly, the first engine inlet 18 comprises a outboard side inlet. As shown in FIG. 2B, the second engine inlet 20 is formed between an inboard nacelle portion 29 and the side 22 of the door 12 when the door 12 is in the second position 16. Accordingly, the second engine inlet 20 comprises an inboard scarfed inlet.

It should be noted, however, that the respective positions of the pivot point 26 and the first and second engine inlets 18 and 20 may vary depending on the particular type of aircraft, engine, and engine mounting arrangement. For example, in other embodiments, the pivot point may be disposed at an inboard and forward most portion of the engine such that first engine inlet comprises an inboard side inlet and the second engine inlet comprises an outboard scarfed inlet. Or for example, the first engine inlet may comprise an upwardly facing inlet that is at least partially defined by a top portion 33 of the engine nacelle 32. As yet another example, the first engine inlet may comprise a downwardly facing inlet that is at least partially defined by a bottom portion 35 of the engine nacelle 32.

Any of a wide range of pivoting type mounting systems may be used to pivotally mount the door 12 to the engine 10. In a preferred embodiment, a hinge 30 is used to mount the door 12 to the engine 10. In addition to pivotally mounting the door 12 to the engine 10, the hinge 30 may also be used to structurally support the lower portion 35 (FIG. 3) of the engine nacelle 32.

Figure 3:
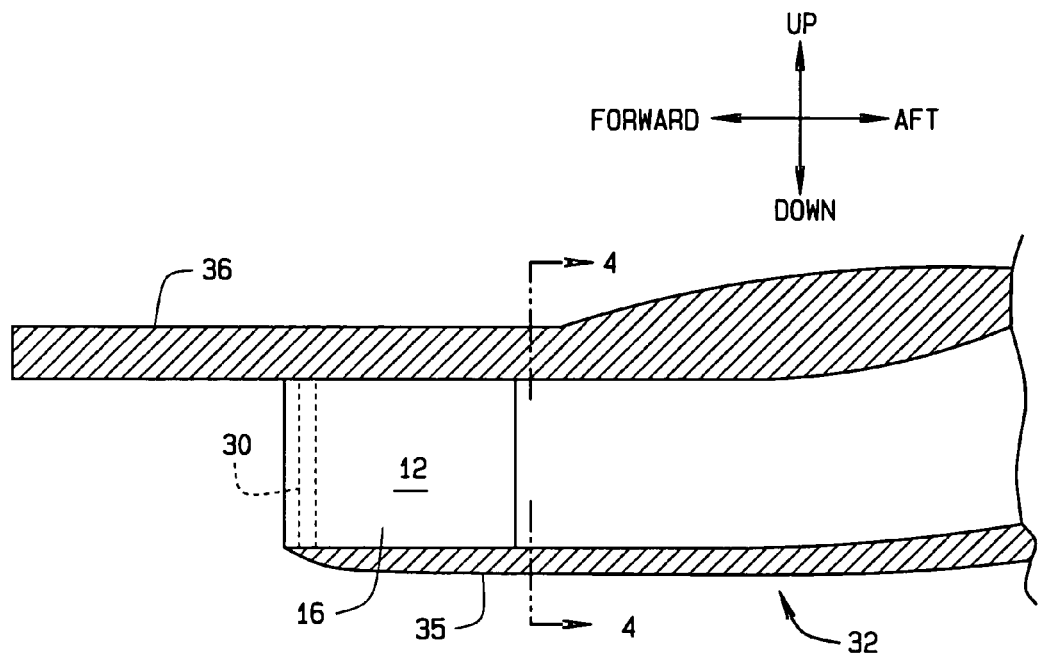
FIG. 3 is a side view of the inlet portion shown in FIGS. 2A through 2C with the outboard nacelle portion removed for clarity.
Figure 4:
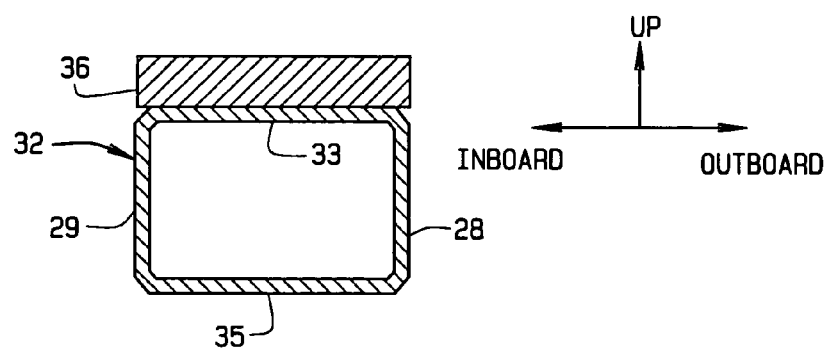
FIG. 4 is a frontal cross-sectional view of a section cut through the plane 4—4 in FIG. 3 illustrating an exemplary inlet shape that may be used for the engine shown in FIG. 1.

Although the engine 10 is shown in FIG. 1 as being positioned aft of the main landing gear assembly 34, such is not required. In addition, the engine 10 need not necessarily be mounted under a wing 36, as shown in FIGS. 3 and 4. Furthermore, the inlet defined by the nacelle 32 need not include a substantially rectangular (FIG. 4) to circular transition. In short, it is anticipated that the invention will be applicable to any one of a wide range of engines regardless of their mounting arrangement.

Preferably, the door 12 allows for tailoring of the airflow into the inlet for cruise spill control purposes (i.e., controlling the shape of the flow across the outermost portion of the engine inlet). To accommodate this feature, the door 12 is preferably positionable in one or more positions other than the second position 16 wherein the second engine inlet 20 is opened while the first engine inlet 18 is closed or blocked by the door 12. For example, and as shown in FIG. 20, the door 12 can be positioned in a third position 38 in which the door 12 is not pivoted as far in the outboard direction as in the second position 16 (shown in FIG. 2B). However, as in the second position 16, when the door 12 is in the third position 38 the second engine inlet 20 is opened while the first engine inlet 18 is closed or blocked by the door 12.

During taxiing, takeoff and landing, the door 12 is preferably in the first position 14 in which the first or outboard side inlet 16 is opened and the second or scarfed inboard engine inlet 18 is at least partially blocked or shielded by the door 12. By doing so, the risk of FOD ingestion by the engine 10 is substantially reduced. During cruise, however, the door 12 is preferably moved to the second position 16 or third position 38 depending at least partially on the need for cruise spill control and the operating conditions of the engine 10. When the door 12 is in the second or third position 16 or 38, the second inlet 20 is open and the door 12 at least partially blocks or shields the first inlet 16.

Figure 5:
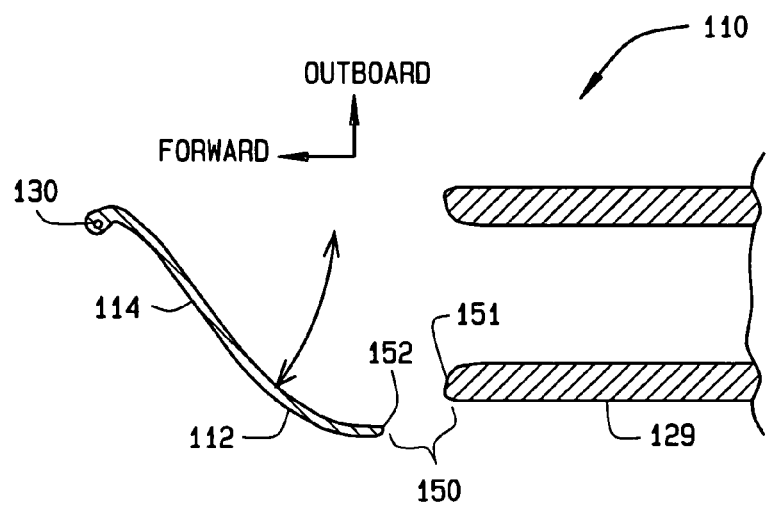
FIG. 5 is an upper plan view of an engine inlet portion including a door for reducing FOD ingestion in accordance with another preferred embodiment of the present invention.

Referring now to FIG. 5, there is shown an alternative embodiment 112 of the door. As shown, the door 112 has a curved cross section and is in a first position 114. The hinge 130 is positioned at an outboard and forward most portion of the engine 110 such that a gap 150 is defined between a forward end portion 151 of the inboard nacelle portion 129 and a rearward end portion 152 of the door 112 when the door 112 is in the first position 114.

Figure 6:
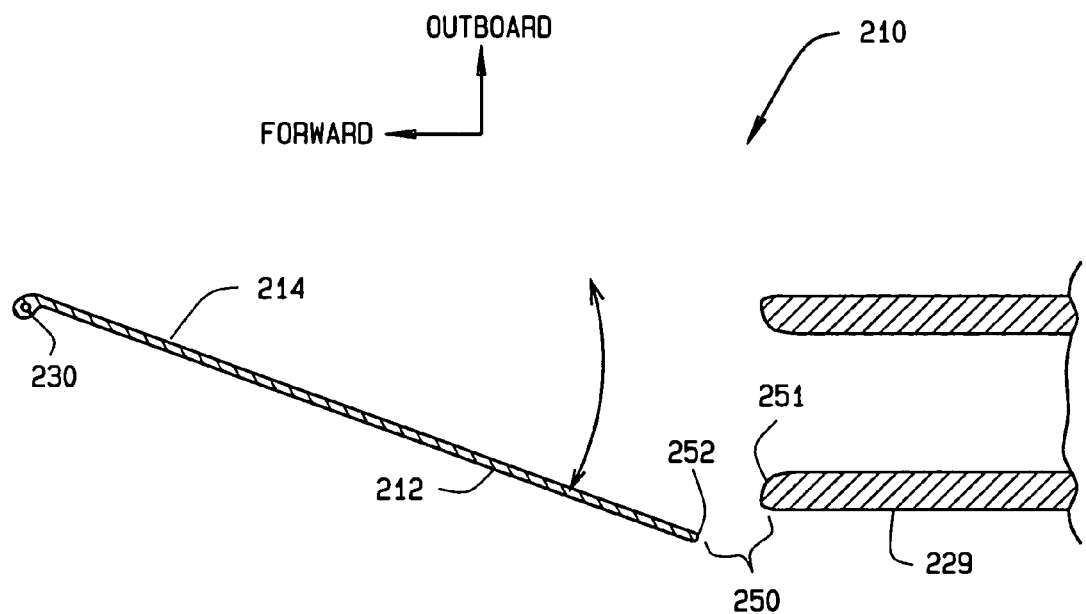
FIG. 6 is an upper plan view of an engine inlet portion including a door for reducing FOD ingestion in accordance with a third preferred embodiment of the present invention.

In FIG. 6, there is shown another alternative embodiment 212 of the door. As shown, the door 212 has a substantially rectangular cross section and is in a first position 214. The hinge 230 is positioned at an outboard and forward most portion of the engine 210 such that a gap 250 is defined between a forward end portion 251 of the inboard nacelle portion 229 and a rearward end portion 252 of the door 212 when the door 212 is in the first position 214.

In another form, the present invention provides a method for reducing FOD ingestion into an aircraft engine. In one embodiment, the method comprises moving the door 12 to the first position 14 when aircraft to which the engine 10 is mounted is taxiing, taking off or landing so that the first engine inlet 18 is opened and the second engine inlet 20 is substantially blocked by the door 12. However, when the aircraft is cruising, the door 12 is moved to the second position or third positions 16 or 38 so that the second engine inlet 20 is opened and the first engine inlet 18 is substantially blocked by the door 12.

Accordingly, the present invention reduces the risk of FOD ingestion into aircraft engines in an economically feasible manner. By reducing the FOD risk, the present also allows for a greater number of landing gear/engine inlet arrangements to be analyzed and/or implemented in order to optimize aircraft performance, including configurations in which engine inlets are position aft of main landing gear assembly. In addition, the present invention also eliminates, or at least reduces, the need for auxiliary air intake doors on aircraft engines which are typically needed during takeoff and landing.

It is anticipated that the invention will be applicable to any of a wide range of aircraft (e.g., but not limited to, military jets, commercial jets, private jets, among others) regardless of the manner in which the aircraft is piloted (e.g., directly, remotely, via automation, or in a combination thereof, among others). Accordingly, the specific references to aircraft herein should not be construed as limiting the scope of the present invention to only one specific form/type of aircraft.

It is also anticipated that the invention will be applicable to any one of a wide range of engines (e.g., but not limited to gas turbine engines, turbofan engines) regardless of the manner in which the engines are mounted to the corresponding aircraft (e.g., but not limited to strut mounted engines, engines mounted forward or aft of the main landing gear assembly, under-wing mounted engines, over-wing mounted engines, wing-level engines, aft-body mounted engines). Accordingly, the specific references to engine herein should not be construed as limiting the scope of the present invention to only one specific form/type of engine or mounting arrangement for the engine.

The description of the invention is merely exemplary in nature and is in no way intended to limit the invention, its application, or uses. Thus, variations that do not depart from the substance of the invention are intended to be within the scope of the invention. Such variations are not to be regarded as a departure from the spirit and scope of the invention.

What is claimed is:

1. Apparatus for reducing foreign object debris ingestion into an engine of a mobile platform, the apparatus comprising:
   a single piece door disposed at a forward end portion of a housing portion of the engine, the door being movable with respect to the engine between at least:
      a first position in which a first engine inlet is open and a second engine inlet is closed by the door; and
      a second position in which the second engine inlet is open and the first engine inlet is closed by the door; and
   at least one hinge pivotally mounting the door to the forward end portion of the housing portion of the engine; wherein the hinge is usable to support at least a portion of the housing portion.

2. The apparatus of claim 1, wherein the at least one hinge is disposed at an outboard portion of the engine.

3. The apparatus of claim 1, wherein the door is configured to allow air flow on both sides of the door as the door moves between the first and second positions.

4. The apparatus of claim 1, wherein the door comprises an at least partially curved cross section.

5. The apparatus of claim 1, wherein:
   at least a portion of the first engine inlet is defined by a side of the door when the door is in the first position; and
   at least a portion of the second engine inlet is defined by another side of the door when the door is in the second position.

6. The apparatus of claim 1, wherein the housing portion comprises an engine nacelle.

7. An aircraft, comprising:
   an engine including a housing portion, the housing portion having a forward end portion; and
   a door disposed at the forward end portion, the door being movable with respect to the engine between at least:
   a first position in which a first engine inlet is open and a second engine inlet is substantially blocked by the door; and
   a second position in which the second engine inlet is open and the first engine inlet is substantially blocked by the door;
   wherein the first and second engine inlets are disposed aft of a main landing gear assembly.

* * * * *